Patented Oct. 28, 1930

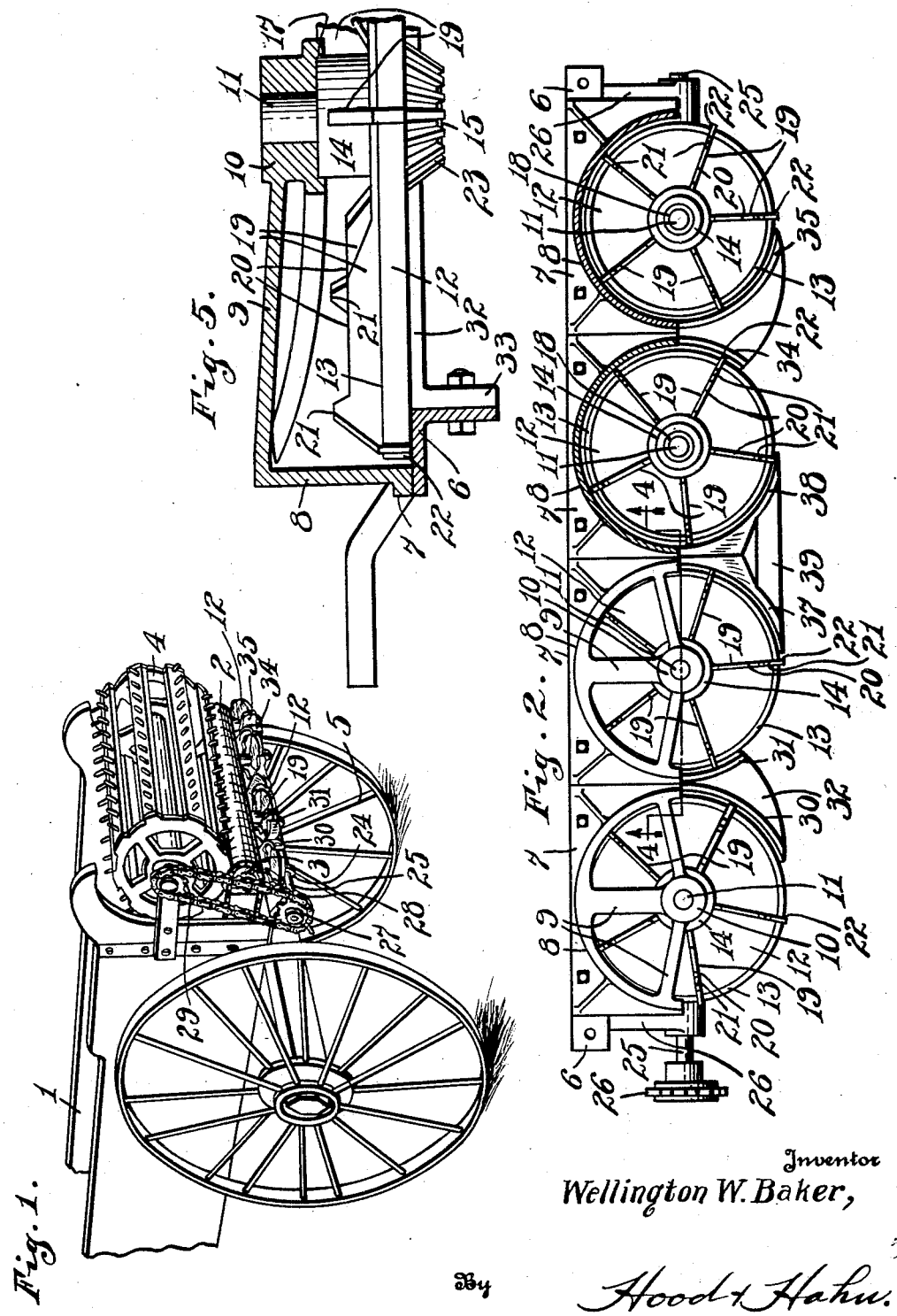

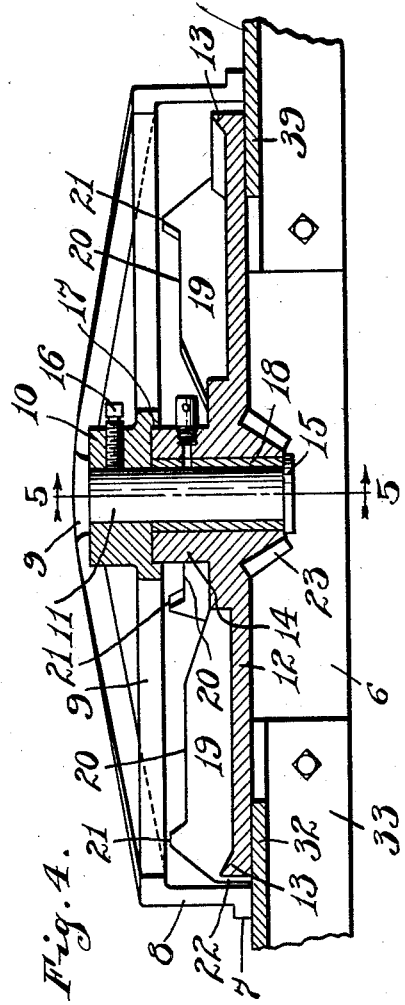
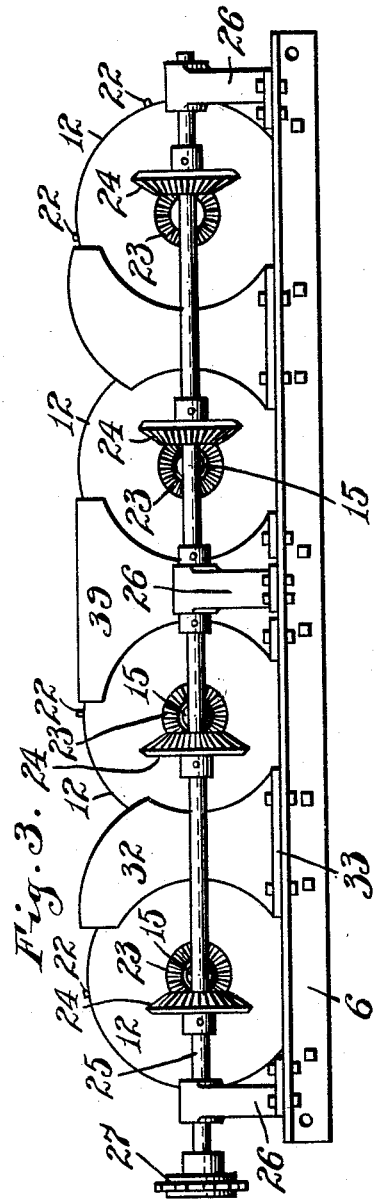

1,779,926

UNITED STATES PATENT OFFICE

WELLINGTON W. BAKER, OF SHEFFIELD, IOWA

FERTILIZER SPREADER

Application filed March 18, 1929. Serial No. 347,781.

My invention relates to improvements in fertilizer distributors and while the invention is adapted for distributing various kinds of fertilizer, it is more particularly adapted for spreading and distributing lime.

It is one of the objects of my invention to provide an improved fertilizer spreader or distributor which may be readily attached to the commercial type of manure spreader and be operated therewith.

Another object of my invention is to provide a spreader which will handle lime irrespective whether the lime is damp or not and which will effectively and evenly distribute the lime over the ground.

For the purpose of disclosing my invention, I have illustrated one embodiment thereof in the accompanying drawings in which, Fig. 1 is a perspective view of the rear end of a manure spreader having my fertilizer distributor attached thereto;

Fig. 2 is a plan view of the distributor;

Fig. 3 is a bottom plan view thereof;

Fig. 4 is a sectional view on the line 4—4 of Fig. 2 and

Fig. 5 is a detail sectional view showing the distributor discs and the support therefor, taken on the line 5—5 of Fig. 4.

My distributor is adapted to be mounted on the rear end of a manure spreader which as illustrated in the accompanying drawings, includes the body 1, having at its bottom a continuous conveyor apron 2 traveling at its rear end over a suitable roller 3. The rear end of the body is also provided with a kicker cylinder 4 and movement is imparted to the apron and to the cylinder by suitable driving mechanism operated from the rear wheel 5 of the spreader. This type of spreader is well known in the art and therefore no great elaboration as to the structure thereof is necessary.

The lime spreader proper consists of a series of horizontally disposed spreader discs which are adapted to be mounted beneath the end of the apron 2, the centers of the discs being immediately beneath the delivery end of the apron. To this end I provide an angle bar 6 which constitutes a support for the spreader discs and their associated parts and which may be bolted or otherwise secured to the rear end of the body 1, by means of suitable bolts extending through the vertical leg of the angle bar. Secured to the top of this bar and extending rearwardly, are a plurality of supporting frames 7, one for each disc. Each of these frames comprise a flat plate, the rear end of which is bolted to the horizontal leg of the angle bar and the forward edge of which is arcuate. Extending upwardly from the forward edge of the plate is an arcuate flange 8 which forms a guard for the disc. This flange at its top is provided with spiders 9 supporting a centrally disposed hub 10, adapted to receive a supporting spindle 11 for the distributor disc 12. Each of the discs 12 is dish-shaped on its upper surface, having an upwardly extending flange 13 and at its center is provided with a hub 14 through the bore of which the supporting spindle 11 extends. This spindle on its bottom is headed as at 15 to support the disc against vertical movement and is secured in the hub 10 by means of a set screw 16. The under face of the hub 10 is recessed as at 17 to receive the top of the disc hub 14 so as to prevent the entry of dust or dirt or the like into the bearing of the disc. The hub 14 is lined with a suitable bushing 18 to take the wear resulting from the rotation of the disc on the bearing pin 11.

Each disc is provided with a series of radially disposed vertically extending fins or webs 19, the height of which increases in steps 20 and 21 toward the periphery of the disc. And these fins it will be noted extend beyond the periphery of the disc and on the edge thereof as at 22.

Each disc has, surrounding the hub 14, a bevel gear 23 adapted to mesh with a bevel gear 24 on a drive shaft 25. This drive shaft is supported in suitable bearings carried at the ends of arms 26 bolted to the vertical leg of the angle bar 6. The drive shaft at one end is provided with a sprocket 27 connected by a drive chain 28 with a sprocket 29 on the shaft of the spreader cylinder 4, whereby the discs are rotated in a horizontal plane from the mechanism which drives the spreader.

In addition to the flanges 8 which form guards for the back portion of the disc, I provide additional guards toward the front edge of the discs to direct the distribution of the fertilizer to be spread. On one side of the end disc, I provide a guard 30 which is arcuate in shape and extends partially around the edge of the disc. This guard is longer than a guard 31 extending partially around the next adjacent disc and the two guards are in the form of flanges extending upwardly from a supporting plate 32 which extends partially beneath the bottoms of the discs. This plate at its rear end is provided with a downturned flange 33 by which it may be bolted or otherwise secured to the vertical leg of the angle 6. Similar guards 34 and 35 are arranged relative to the disc at the opposite end and its next adjacent disc, the inner guard 34 being shorter than the guard 35. Guard flanges 37 and 38 extending upwardly from a supporting plate 39 and are arranged adjacent the adjacent edges of the center discs, these flanges being of equal length. In each instance these guard flanges, as well as the guard flanges 8 are slightly separated from the peripheral edge of the discs to allow for clearance, but any fertilizer which drops down between the edge of the disc and the flange is swept out by the projecting edges 22 of the ribs 19. It will be noted that by the arrangement of the guard flanges the fertilizer can only be thrown from the discs at certain points thereby controlling the spread of the fertilizer.

In operation the lime or other fertilizer to be distributed is loaded in the wagon body and on top of the apron 2. By determining the depth to which the fertilizer is loaded, the operator can determine the quantity spread for a given portion of ground. As the apron moves rearwardly, being driven by the rotation of the wheels of the wagon, the fertilizer is deposited from the end of the apron on to the discs of the spreader and as these discs rotate they, through the action of centrifugal force, throw the fertilizer outwardly through the openings left by the guard plates and effectively spread the fertilizer over the ground.

I claim as my invention:

1. In a device of the character described, the combination with a wagon having a conveyor in its bottom delivering at the rear end of the wagon, of a fertilizer distributor mounted on the rear end of said wagon and comprising a supporting bar secured to the rear end of the wagon, a plurality of spiders secured to and extending rearwardly from said bar and a horizontally disposed disc rotatably supported from and beneath each of said spiders and in a position to receive the material delivered by said apron.

2. In a device of the character described, the combination with a wagon having a conveyor in its bottom delivering at the rear end of the wagon, of a fertilizer distributor mounted on the rear end of said wagon and comprising a supporting bar secured to the rear end of the wagon, a plurality of spiders secured to and extending rearwardly from said bar, a horizontally disposed disc rotatably supported from and beneath each of said spiders and in a position to receive the material delivered by said apron, and guards surrounding a portion of the peripheries of each disc to prevent the delivery of material therefrom, except at a predetermined point.

3. In a device of the character described, the combination with a wagon, having a conveyor in its bottom delivering at the rear end of the wagon of a fertilizer distributor mounted on the rear end of said wagon in a position to receive the material delivered by said conveyor, comprising a plurality of dishlike horizontally revolving discs, each having vertical radially extending ribs on its upper face, said ribs increasing in height toward the periphery of the discs.

4. In a device of the character described, the combination with a wagon, having a conveyor in its bottom delivering at the rear end of the wagon of a fertilizer distributor mounted on the rear end of said wagon, comprising a plurality of dishlike horizontally revolving discs, each having vertical radially disposed ribs on its upper face, said ribs projecting beyond and extending over the periphery of said discs and guards partially surrounding said discs and projecting above the top surface thereof.

5. In a device of the character described, the combination with a wagon, having a conveyor in its bottom delivering at the rear of the wagon of a fertilizer distributor mounted on the rear end of said wagon and comprising a plurality of horizontally revolving discs, each disc having radially disposed vertical ribs on its upper face and guards partially surrounding the periphery of said discs and extending above the top surface thereof, said guards being projected beneath the bottom edges of the discs.

6. A fertilizer distributor adapted for mounting upon the rear of a vehicle, comprising a plurality of discs rotating in a horizontal plane, each disc having vertical radially extending ribs on the upper face thereof projecting beyond and extending over the periphery of the disc, and guards partially surrounding said discs and having flanges extending beneath the discs.

7. A fertilizer distributor adapted for mounting upon the rear of a vehicle, comprising a plurality of spiders, each having a center hub, a spindle supported in said hub, and a horizontally disposed disc rotatably supported on said spindle beneath the spider hub and having a center hub, and an annular flange on said spider hub overhanging the disc hub.

8. A fertilizer distributor adapted for mounting upon the rear end of a vehicle, comprising a plurality of dish like horizontally revolving discs, each disc having a plurality of radially disposed vertical ribs on its upper face and overhanging the peripheral edge of the disc, and guards partially surrounding the periphery of said discs, spaced apart therefrom to accommodate the overhanging ribs and having horizontal flanges extending beneath the discs.

In witness whereof, I, WELLINGTON W. BAKER, have hereunto set my hand at Sheffield, Iowa, this 14th day of March, A. D. one thousand nine hundred and twenty-nine.

WELLINGTON W. BAKER.